US005368633A

United States Patent [19]

Foldyna et al.

[11] Patent Number: 5,368,633

[45] Date of Patent: Nov. 29, 1994

[54] PRESSURIZED RADIOACTIVE GAS TREATMENT SYSTEM

[75] Inventors: Joseph T. Foldyna; Donald J. Carpenter; John M. Cron, all of Boise, Id.

[73] Assignee: Morrison-Knudson (an Idaho corporation), Boise, Id.

[21] Appl. No.: 105,398

[22] Filed: Aug. 12, 1993

[51] Int. Cl.[5] ........ B01D 46/00

[52] U.S. Cl. ........ 95/19; 95/273; 376/314; 976/DIG. 378

[58] Field of Search ........ 95/19, 127, 273, 241, 95/901; 252/633; 376/310, 311, 312, 313, 314; 976/DIG. 378

[56] References Cited

U.S. PATENT DOCUMENTS

| | | | |
|---|---|---|---|
| 3,093,564 | 6/1963 | Weisman et al. | 976/DIG. 378 |
| 3,362,883 | 1/1968 | Wright | 976/DIG. 378 |
| 3,556,941 | 1/1971 | Takahashi | 376/314 |
| 3,863,601 | 12/1974 | Stringer | 55/37 |
| 3,871,841 | 3/1975 | Queiser et al. | 95/901 |
| 3,963,460 | 6/1976 | Stumpf et al. | 376/314 |
| 4,277,256 | 7/1981 | Hesky et al. | 976/DIG. 378 |
| 4,435,194 | 3/1984 | Picard et al. | 95/19 |
| 4,500,328 | 2/1985 | Brassell et al. | 95/273 |
| 4,766,724 | 7/1988 | Yuill | 55/165 |
| 4,869,832 | 9/1989 | Lamarre | 216/747 |
| 4,988,237 | 1/1991 | Crawshaw | 405/229 |

*Primary Examiner*—Charles S. Bushey
*Attorney, Agent, or Firm*—Frank J. Dykas; Craig M. Korfanta

[57] ABSTRACT

A system for collecting, transferring and storing radioactive gas released from other radioactive materials. In the described process, gas pump (24) removes gas from a headspace volume within an unvented radioactive material storage vessel (8). The gas is cooled in an after-cooler (28) and discharged into a receiver (32). As pressure in receiver (32) increases, compressed gas is transferred to a selected pressurized decay vessel (44 or 50), in which the radioactive gas remains for a predetermined decay period. After expiration of decay period, decayed gas is either recycled back to the radioactive material storage vessel (8) via recycled gas recirculation line (52) and pressure reducing valve (54), or is discharged to atmosphere through an activated carbon and high-efficiency particulate filters (48), removing remaining undecayed radioactive gas and particulate daughter products. Headspace pressure within unvented material storage vessel (8) is maintained by means of pressure controlled recirculation of gas from receiver (32) through recirculation line (36) and pressure control valve (38).

12 Claims, 1 Drawing Sheet

PRESSURIZED RADIOACTIVE GAS TREATMENT SYSTEM

BACKGROUND OF THE INVENTION

1. Technical Field

This invention relates generally to radioactive gas removal, and in particular to removal of gas emitted during processing of radioactive material.

2. Prior Art

Storage and disposal of nuclear waste and contaminated material generated by the nuclear industry has always been a significant problem. Presently today there exists a substantial quantity of untreated radioactive waste material held in inadequate, substandard or temporary storage facilities. In particular, the enrichment process for nuclear fuels, primarily uranium, generates a substantial amount of waste material which, in the industry, is oftentimes stored at the bottom of specially designed water tanks. In the industry, this material is usually called an uranium raffinate and is a mixture of a large number of various radioactive elements suspended within, or agglomerated within water. The present preferred method of permanent storage for these waste materials is to somehow remove the waste materials from water storage and mix them in with other materials such as cement to form solid blocks which are then contained within the leak-proof permanent storage containers and which can be held and safely stored for the literally thousands of years necessary for the decay process to reduce the material to a harmless non-radioactive waste product.

The problem is that these waste materials, particularly uranium raffinate, contains entrained radioactive gasses, particularly radon gas which is a radioactive daughter product of radium 226, which itself is a decay product of uranium. As the uranium raffinate is being handled, for example, being removed from a water storage tank for eventual processing into solid form, some of the entrained radon will be released to atmosphere.

The present invention is directed to a pressurized radioactive gas treatment system for containing radioactive gas released from uranium raffinate and various other materials. The actual mechanical systems by which uranium raffinate or any other radioactive waste material is treated plays no part in the present invention. However, it is helpful to describe a typical system so as to put the present invention in a proper context so as to more fully appreciate this invention. It should be clearly understood that the following description is not intended to limit the scope of the invention, but is only intended to provide an aid in understanding it.

Uranium raffinate typically settles to the bottom of a water tank forming a semi-solid having a very high water content. This material can be dug, augured, scooped or shoveled out by mechanical means and when it is so handled, it turns back into a raffinate slurry, which is capable of being pumped. The raffinate slurry is then pumped into a holding tank which serves as a steady source of supply for additional machinery in further processing steps. These additional steps would include removing or reducing the water content from the raffinate, and then mixing the raffinate with other materials such as sand and cement to form solid blocks which can be safely handled and stored.

During this processing, each time the raffinate is disturbed, minute amounts of highly radioactive radon gas are released from the raffinate. These are found to be very small quantities on the order of just a few cubic millimeters per ton of material, but it is highly radioactive and cannot be released into the atmosphere. If it is, it can cause significant problems, particularly since radon is a gas and disperses well within the atmosphere and its decay chain includes significant particulate radioactive radon daughters of polonium, lead and bismuth.

Not only is there a problem of containing this released radon, there is also the problem of handling it since the quantities being released, although highly radioactive, are very small and difficult to handle.

For this reason, the storage tanks used in the initial stages of radioactive material processing, should not be vented to the atmosphere. However, this in itself is a problem, since current technologies in use today result in a de facto batch feed process for filling the tank and a continuous process for emptying the storage tank. For example, raffinate may be extracted from the water tank only during daylight hours, yet the outflow from the storage tank may be into a continuous process, which runs 24 hours a day. Thus, the amount of radioactive material stored within a storage tank may vary considerably during the cycle of operation, thereby making the use of an unvented tank unfeasible.

Accordingly, it is an object of the present invention to provide a system for collecting and safely disposing of quantities of radioactive gasses released from other radioactive materials during processing.

DISCLOSURE OF INVENTION

This object is accomplished by use of a closed loop processing system in which radon or other radioactive gasses released or generated by radioactive material is removed from the unvented headspace of the storage tank or other container, and is compressed to reduce its volume. A carrier gas is added as necessary to facilitate radioactive gas transfer when the radioactive gas volume is not sufficient for effective handling. In addition, the carrier gas may serve to purge radioactive gasses entrained within the other radioactive material. The carrier gas may be either or both of newly introduced gas or gas recycled from the discharge of a pressurized decay vessel, discussed below.

Once removed from the unvented tanks, the compressed mixture of carrier and radioactive gasses is then cooled and transferred into a gas receiving vessel. From this receiver, the mixture of carrier and radioactive gasses may be directed into either of two circuits. A first circuit is a recirculation line through a pressure control valve back to the original storage container head space and is used to maintain a set point pressure within the tank regardless of whether the tank is full or nearly empty. The second circuit provides controlled feed of the compressed mixture of radioactive carrier gas via a pressure regulating valve into a pressurized decay vessel.

When the pressurized decay vessel is fully pressurized, it is isolated from the remainder of the circuit and the gas remains stored, under pressure, until it is sufficiently decayed and safe to release to the atmosphere or is recycled back into the storage tank to become carrier gas. Radon, for example, is considered safe for release after approximately twenty-one (21) days of decay time. While the decay tank is isolated, gas from the receiver vessel is directed to a standby decay vessel. Decayed gas which is discharged to the atmosphere passes through an activated carbon filter or a high-efficiency particulate filter to remove the particulate radon daughters.

BEST MODE FOR CARRYING OUT INVENTION

Figure 1:
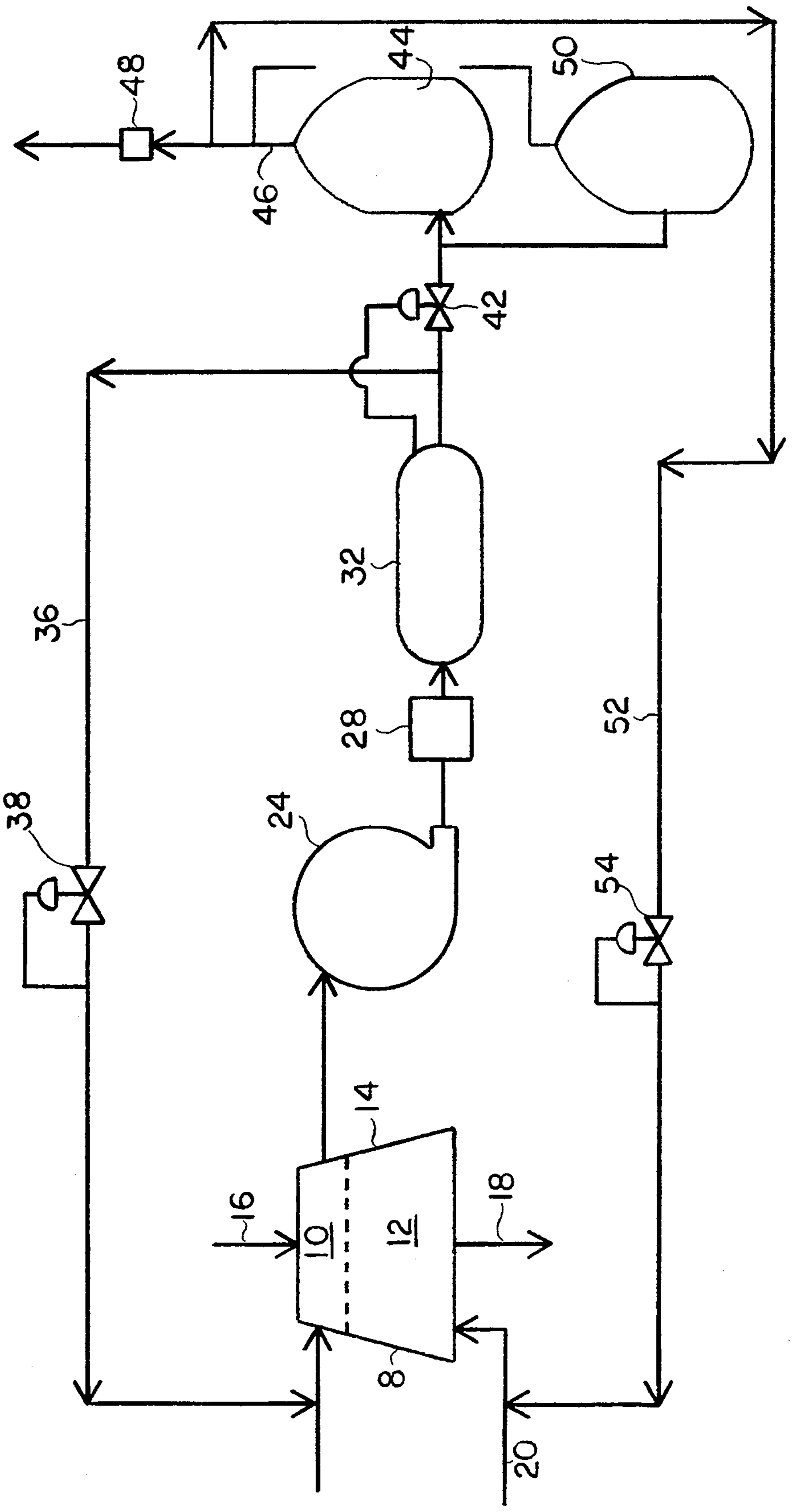
FIG. 1 is a schematic flow diagram of a pressurized radioactive gas treatment system constructed in accordance with the preferred embodiment of the present invention.

A simplest embodiment of the present invention is shown in schematic form in FIG. 1. In this simple embodiment, the pressurized radioactive gas treatment system is configured to capture and process radioactive gas being released from other radioactive material 12 held within storage tank 8. The system is configured for purposes of this specification to include one gas receiver vessel 32 and two pressurized decay vessels 44 and 50. It should be apparent to those skilled in the art that a pressurized radioactive gas treatment system incorporating the features of the present invention could be easily designed and configured with a plurality of radioactive material vessels and more than two pressurized decay vessels. Furthermore, vessel sizes, system flow rates, etc., may be varied within the scope of the present invention to achieve a desired capacity.

The system begins with an unvented radioactive material vessel 8. The vessel's capacity can be literally of any size, ranging from just a few cubic meters to hundreds of thousands of cubic meters. The vessel may be constructed of any suitable material and may be of any shape, though in a preferred embodiment a carbon steel cylindrical body vessel with a conical bottom is used.

Radioactive material 12 flows into the radioactive material vessel 8 via radioactive material influent line 16 and out via radioactive material discharge line 18. The radioactive material for which the present invention was initially developed, is a uranium raffinate. However, it may be a solid, liquid, or anything in between. In the preferred embodiment, the radioactive material 12 empties into radioactive material vessel 8 at a rate which does not match the outflow rate. As a result, headspace volume 10 varies due to changes in radioactive material level 14, as radioactive material 12 is periodically deposited in and flows into the tank, while at the same time being withdrawn at a steady continuous flow rate.

Gas pump 24 is provided and draws its suction from headspace 10. Since storage tank 8 is unvented, if nothing further were done, gas pump 24 would merely draw a vacuum in headspace 10 when it is operating, and when not operating, pressures within headspace 10 may fluctuate dramatically as the tank is periodically filled to capacity and then emptied again to near empty of radioactive material 12. An inflow only vent could be provided to permit the addition of air into headspace 10 during periods of vacuum, but as will be seen later, storage decay vessels 44 and 50 have a finite capacity and it is a feature of the present invention to reduce the amount of carrier gasses or air introduced into the system to that required for efficient handling and transfer of the radioactive gasses.

Instead, pressure in headspace volume 10 is maintained by pressure control valve 38 through recirculation line 36, both described below. In the preferred embodiment, headspace volume 10 is maintained at the positive pressure of approximately one inch water above atmospheric pressure, though a range of pressures at above or below atmospheric pressure are acceptable.

As previously stated in the prior art section, the actual physical quantity of radon released from the uranium raffinate is quite low, just a few cubic millimeters per ton of material. As a result, these very low quantities are very difficult to collect and handle. For that reason, a carrier gas is injected as necessary into the radioactive material vessel 8 through gas injection line 20. The purpose of the injected gas is to provide a carrier gas to facilitate radioactive gas transport when the released radioactive gas is insufficient for handling. The injected gas may also serve to purge entrained radioactive gas from the radioactive material. In the preferred embodiment, air is injected intermittently in 5 to 10 second bursts with only enough air being injected to meet minimum pump flow requirements for gas pump 24. The carrier gas may be simply air, or inert gases, steam, or combustion gases, and/or decayed gas recycled from pressurized decay vessel release line 46 via recycled gas recirculation line 52 and pressure reducing valve 54. The carrier gas is injected at gas pressures commensurate with the specific gravity of the radioactive material 12 being handled.

The accumulated mixture of carrier and radioactive gas is removed from headspace volume 10 by gas pump 24, which discharges through aftercooler 28 into gas receiver vessel 32. The pump is used to compress the mixture of carrier and radioactive gasses so that a higher quantity may be stored in pressurized decay vessel 44. The operating parameters for gas pump 24 are dependent upon the desired gas compression, radioactive material vessel 8 capacity, and the radioactive material inflow rate. The pump must be capable of keeping up with the rate of headspace volume 10 decrease caused by the maximum radioactive material level rate of increase. In the preferred embodiment pump 24 is a piston type compressor, but other types such as rotary types may be substituted.

Aftercooler 28 serves to reduce the temperature, and thus the volume, of the compressed gas discharged from gas pump 24, thus allowing for more gas to be stored and decayed in pressurized decay vessels 44 and 50. In the preferred embodiment, aftercooler 28 is of the air cooled type, but a water cooled type aftercooler or other suitable kind which is of sufficient capacity may be used. In the preferred embodiment, the design system pressure for storage of the mixture of radioactive and carrier gasses in storage decay vessels 44 and 50 is 175 lbs. per square inch, at a design temperature in the approximate range of 80° Fahrenheit to 100° Fahrenheit. Other design system pressures and temperatures may be achieved as desired. For this reason, decay storage vessels 44 and 50 are also insulated in any conventional or well-known manner so as to preclude unwanted temperature increases caused by thermal load or outside environment or other environmental changes which would increase pressures above system design pressures which could force or necessitate a premature release of gas to the atmosphere.

The mixture of carrier and radioactive gasses passes through aftercooler 28 into receiver 32. Here the mixture of gasses is temporarily stored under pressure and is directed to one of two paths. Receiver 32 is sized to hold, under system design pressure, a sufficient quantity of the mixture of radioactive and carrier gas to maintain system design set point pressure in head space 10 when storage tank 8 is completely empty. The mixture of carrier and radioactive gasses is returned, or recycled, to radioactive material vessel 8 through recirculation of line 36. The return rate is controlled by pressure control valve 38. Pressure control valve 38 senses downstream pressure in headspace volume 10, and admits return gas from receiver 32 as necessary to maintain the aforementioned preferred embodiment positive one inch water pressure in the headspace volume 10. In the preferred embodiment, pressure control valve 38 is a standard pneumatically controlled pressure control valve, but any suitable pressure-controlling valve or system may be used. The use of this recirculation system instead of an inflow vent minimizes the amount of injected carrier gas to that required to handle the radon once the system, particularly receiver 32, is filled to operating capacity.

The other path out of gas receiver 32 is into pressurized decay vessels 44 and/or 50 through pressure regulating valve 42. Gas which is not returned to the radioactive material vessel 8 via recirculation line 36 accumulates in gas receiver 32. Pressure regulating valve 42 senses pressure in gas receiver 32 and admits gas from receiver 32 into the selected pressurized decay vessel whenever gas receiver pressure is greater than 175 pounds per square inch, in the preferred embodiment. Other pressure set points may be applicable in specific system configurations. The preferred embodiment pressure regulating valve 42 is a standard back pressure control valve.

Once the pressure in the selected pressure decay vessel either 44 or 50 reaches approximately 175 pounds per square inch (in the preferred embodiment, or other set point pressure as may be selected), the vessel is isolated and flow out of pressure regulating valve 42 is directed to the other or standby pressure decay vessel 44 or 50.

Pressurized decay vessels 44 and 50 provide a holding volume in which the quantity of compressed carrier gas and radioactive gas remain while the radioactive gas decays to an activity level at which it may safely be discharged to atmosphere. In the preferred embodiment, pressurized decay vessel 44 is a carbon steel tank having a capacity at least sufficient to entirely pump down and contain all of the gas contained in the recovery system.

While one pressurized decay vessel is being filled, the other is isolated and in a decay mode. Once decay is complete in one vessel, the decayed gas is released and vessel functions are switched. The decayed gas is released to atmosphere via pressurized decay vessel release line 46 or recycled to storage tank 8 via recycled gas recirculation line 52. Pressure of the recycled gas is controlled by pressure reducing valve 54. Pressure reducing valve 54 reduces recycled gas pressure to 15 lbs. per square inch in the preferred embodiment. Any suitable pressure setting may be used, however.

Recycling all or a portion of the decayed gas serves both to reduce when necessary the radioactivity released to atmosphere and to reduce the amount of new carrier gas injected into the system. Reducing the amount of new carrier gas injected into the system reduces system gas loading and hence reduces pressurized decay vessel capacity requirements. Residence time of the radioactive gas in either decay pressure vessel is, in the case of radon, approximately twenty-one (21) days.

Decayed gas which is released to the atmosphere via pressurized decay vessel release line 46 passes through an activated carbon or a high-efficiency particulate filter 48, which removes remaining radioactive gas and the particulate daughter products.

While there is shown and described the present preferred embodiment of the invention, it is to be distinctly understood that this invention is not limited thereto but may be variously embodied to practice within the scope of the following claims.

We claim:

1. A method of collecting and disposing of radioactive gas released from other material which comprises:
   (a) containing the other material in a container not vented to atmosphere;
   (b) injecting carrier gas into the unvented container;
   (c) transferring the carrier gas and radioactive gas from the unvented container to a decay vessel;
   (d) controlling the gaseous pressure within the unvented container at a predetermined pressure at, above or below atmospheric pressure by recycling at least a portion of the gases transferred from the unvented container back into the unvented container;
   (e) controlling the pressure at which the recycled gas is reintroduced into the unvented container;
   (f) holding the radioactive gas and carrier gas in the decay vessel for a period of time to allow the radioactive gas to decay to a predetermined level of radioactivity; and
   (g) releasing the carrier gas and radioactive gas from the decay vessel when the radioactivity of the radioactive gas has dropped to the predetermined level of radioactivity.

2. The method of claim No. 1, wherein the step of releasing the carrier and radioactive gases from the decay vessel further includes the step of filtering the gases to remove particulate decay daughters of the decayed radioactive gas from the gas released.

3. The method of claim No. 1 which further comprises the step of holding the portion of the gases to be recycled in a receiver.

4. A method of collecting and disposing of radioactive gas released from other material which comprises:
   (a) containing the other material in a container not vented to atmosphere;
   (b) injecting carrier gas into the unvented container;
   (c) transferring the carrier gas and radioactive gas from the unvented container to a decay vessel;
   (d) holding the radioactive gas and carrier gas in the decay vessel for a period of time to allow the radioactive gas to decay to a predetermined level of radioactivity;
   (e) releasing the carrier gas and radioactive gas from the decay vessel when the radioactivity of the radioactive gas has dropped to the predetermined level of radioactivity;
   (f) recycling back into the unvented container at least a portion of the gases released from the decay vessel; and
   (g) controlling the pressure at which the recycled gas is reintroduced into the unvented container.

5. In an apparatus for collecting and disposing of radioactive gas released from other material held in a container having means for sealing the container in which the other material is contained so that the container is not vented to atmosphere, means for injecting a carrier gas into the unvented container, means for pumping the carrier and radioactive gases from the unvented container to a decay vessel, a decay vessel for holding the radioactive and carrier gases in the decay vessel for a period of time to allow the radioactive gas to decay to a predetermined level of radioactivity operatively connected to the pumping means, and means for releasing the mixture of carrier and radioactive gases when the radioactivity of the radioactive gas has dropped to the predetermined level of radioactivity, a method of collecting and disposing of radioactive gas released from other material which comprises:

(a) containing the other material in the sealed container not vented to atmosphere;
(b) injecting a carrier gas into the unvented container;
(c) pumping the carrier and radioactive gases from the unvented container to a decay vessel;
(d) controlling the gaseous pressure within the unvented container at a predetermined pressure at, above, or below atmospheric pressure by recycling at least a portion of the gases pumped from the unvented container back into the unvented container;
(e) controlling the pressure at which the recycled gas is reintroduced into the unvented container;
(f) holding the radioactive and carrier gases in the decay vessel for a period of time to allow the radioactive gas to decay to a predetermined level of radioactivity; and
(g) releasing the carrier and radioactive gases when the radioactivity of the radioactive gas has dropped to the predetermined level of radioactivity.

6. The method of claim No. 5 wherein the step of releasing the carrier and radioactive gases further includes the step of filtering the gases to remove particulate decay daughters of the decayed radioactive gas from the gas released.

7. The method of claim No. 5 which further comprises the step of holding the portion of the gases to be recycled in a receiver.

8. In an apparatus for collecting and disposing of radioactive gas released from other material held in a container having means for sealing the container in which the other material is contained so that the container is not vented to atmosphere, means for injecting a carrier gas into the unvented container, means for pumping the carrier and radioactive gases from the unvented container to a decay vessel, a decay vessel for holding the radioactive and carrier gases in the decay vessel for a period of time to allow the radioactive gas to decay to a predetermined level of radioactivity operatively connected to the pumping means, and means for releasing the mixture of carrier and radioactive gases when the radioactivity of the radioactive gas has dropped to the predetermined level of radioactivity, a method of collecting and disposing of radioactive gas released from other material which comprises:

(a) containing the other material in the sealed container not vented to atmosphere;
(b) injecting a carrier gas into the unvented container;
(c) pumping the carrier and radioactive gases from the unvented container to a decay vessel;
(d) holding the radioactive and carrier gases in the decay vessel for a period of time to allow the radioactive gas to decay to a predetermined level of radioactivity;
(e) releasing the carrier and radioactive gases when the radioactivity of the radioactive gas has dropped to the predetermined level of radioactivity;
(f) recycling back into the unvented container at least a portion of the gases pumped from the unvented container to the decay vessel; and
(g) controlling the pressure at which the recycled gas is reintroduced into the unvented container.

9. A method of collecting and disposing of radioactive gas released from other material which comprises:

(a) containing the other material in a container not vented to atmosphere;
(b) injecting a purge gas into the unvented container;
(c) transferring the purge and radioactive gases from the unvented container to a decay vessel;
(d) recycling at least a portion of the gases transferred from the unvented container back into the unvented container;
(e) controlling the pressure at which the recycled gas is reintroduced into the unvented container;
(f) holding the radioactive and purge gases in the decay vessel for a period of time to allow the radioactive gas to decay to a predetermined level of radioactivity; and
(g) releasing the purge and radioactive gases from the decay vessel when the radioactivity of the radioactive gas has dropped to the predetermined level of radioactivity.

10. The method of claim No. 9 wherein the step of releasing the purge and radioactive gases from the decay vessel further includes the step of filtering the gases to remove particulate decay daughters of the decayed radioactive gas from the gas released.

11. The method of claim No. 9 which further comprises the step of holding the portion of the gases to be recycled in a receiver.

12. A method of collecting and disposing of radioactive gas released from other material which comprises:

(a) containing the other material in a container not vented to atmosphere;
(b) injecting a purge gas into the unvented container;
(c) transferring the purge and radioactive gases from the unvented container to a decay vessel;
(d) holding the radioactive and purge gases in the decay vessel for a period of time to allow the radioactive gas to decay to a predetermined level of radioactivity;
(e) releasing the purge and radioactive gases from the decay vessel when the radioactivity of the radioactivity;
(f) recycling back into the unvented container at least a portion of the gases pumped from the unvented container to the decay vessel; and
(g) controlling the pressure at which the recycled gas is reintroduced into the unvented container.

* * * * *

UNITED STATES PATENT AND TRADEMARK OFFICE

CERTIFICATE OF CORRECTION

PATENT NO. : 5,368,633

DATED : November 29, 1994

INVENTOR(S) : Foldyna, et al

It is certified that error appears in the above-identified patent and that said Letters Patent is hereby corrected as shown below:

On the title page, item [73] Assignee: "Morrison-Knudson" should read -- Morrison-Knudsen--.

Signed and Sealed this

Sixteenth Day of January, 1996

Attest:

BRUCE LEHMAN

*Attesting Officer* *Commissioner of Patents and Trademarks*